Nov. 8, 1955
F. WOOD
2,723,325
WATER HEATER CUT-OFF DEVICE
Filed Jan. 5, 1953
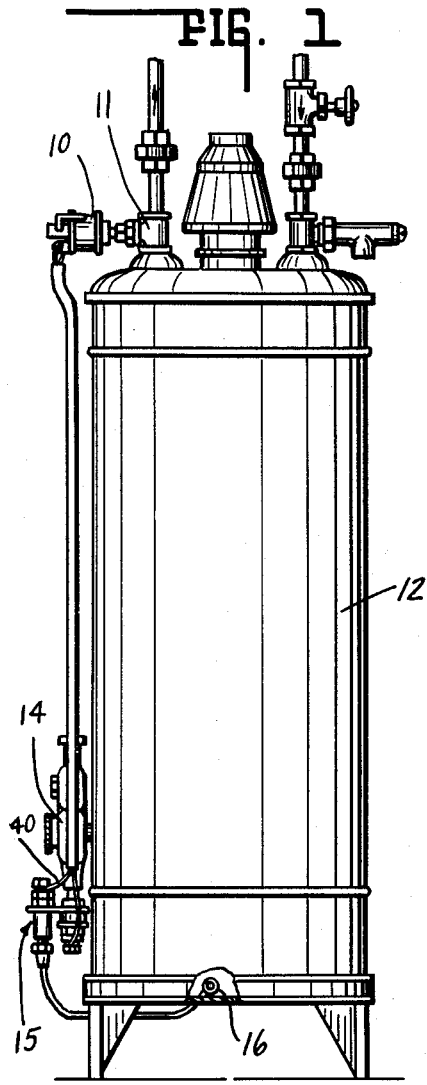
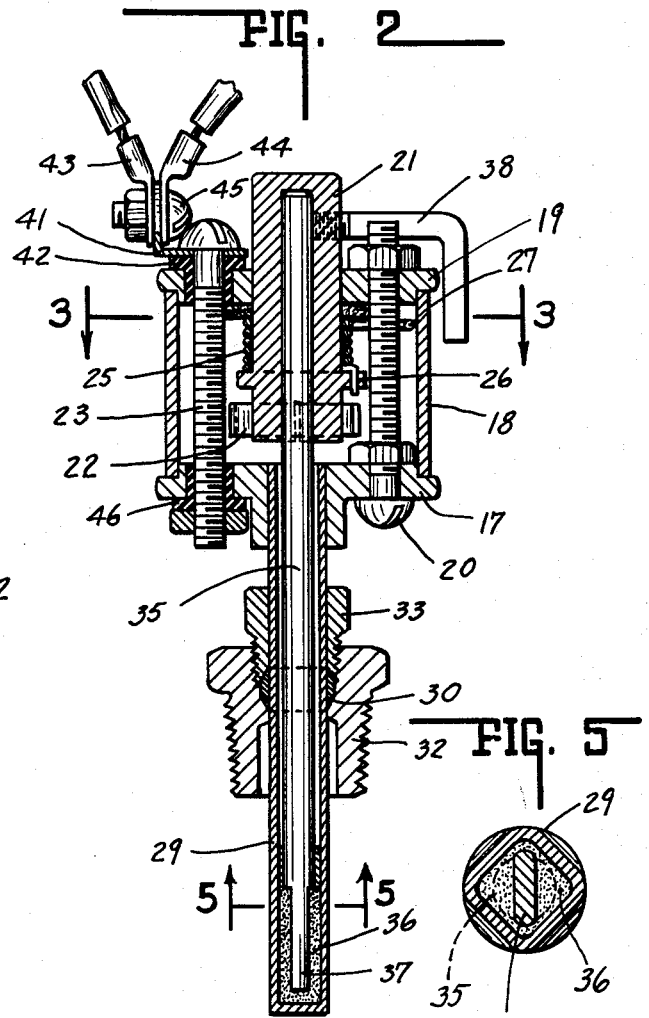
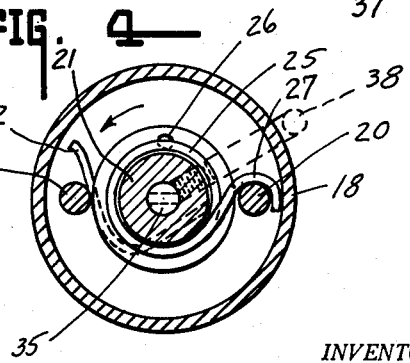
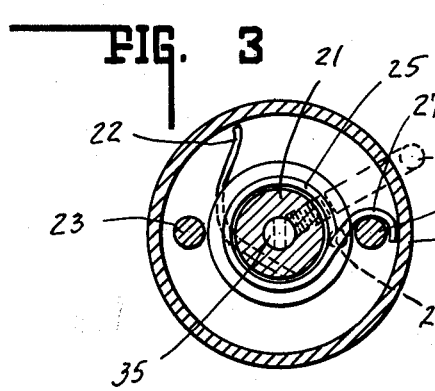
INVENTOR.
FRANK WOOD.
BY
Lockwood, Galt, Woodard & Smith,
ATTORNEYS.

United States Patent Office 2,723,325
Patented Nov. 8, 1955

2,723,325

WATER HEATER CUT-OFF DEVICE

Frank Wood, Indianapolis, Ind., assignor of one-half to Easton A. McKibbon, Indianapolis, Ind.

Application January 5, 1953, Serial No. 329,642

3 Claims. (Cl. 200—142)

This invention relates generally to apparatus for automatically controlling domestic water heaters, and more particularly it relates to a temperature controlled switch for controlling the valve of a gas water heater in response to excessive water temperature.

Domestic hot water heaters are known to heat water to excessive temperatures when the thermostatic controls become defective or fail to operate at a pre-set temperature due to formation of scale, corrosion or the like. When thermostatic control apparatus fails, the heating element, whether it be electrical or gas operated, then heats the water to excessively high temperatures and sometimes to boiling temperature whereby steam is caused to circulate in the water supply system with consequent danger to the occupants of the home or the neighboring homes.

Accordingly, it is the principal object of this invention to provide a temperature responsive device for automatically cutting off the heating element of a domestic hot water heater when the water temperature exceeds a predetermined temperature.

Another object of this invention is to provide an automatically operating switch which responds to a predetermined temperature in a domestic hot water heater for actuating the conventional thermocouple apparatus which is used for shutting off the source of gas of a gas hot water heater when the pilot flame is extinguished accidently.

Still another object of this invention is to provide a temperature responsive electrical switch for domestic hot water heaters which may be repeatedly reset after each operation thereof.

Still another object of this invention is to provide an electrical switch which is adapted to operate in conjunction with electrical circuits having relatively small voltage and current characteristics.

In accordance with this invention there is provided an automatically operated cut-off switch for domestic hot water heaters comprising a spring operated actuating element, a fusible restraining member for holding said actuating element in a given idle position until a predetermined temperature occurs, and a wiping contact operatively associated with said actuating element for effectively de-energizing the thermocouple circuit of a gas control valve in a domestic hot water heater.

The full nature of the invention will be understood from the accompanying drawings and the following description and claims:

Fig. 1 is a side elevation view of a domestic hot water heater and the automatic cut-off device provided in accordance with this invention.

Fig. 2 is a cross sectional view of the cut-off device provided in accordance with this invention.

Fig. 3 is a cross sectional view taken on line 3—3 of Fig. 2 illustrating the control switch in open position.

Fig. 4 is a cross section taken on line 3—3 of Fig. 2 illustrating the control switch in closed position.

Fig. 5 is a cross sectional view taken on line 5—5 of Fig. 2.

In accordance with this invention there is provided an automatic cut-off switch 10 mounted in the outlet pipe 11 of a conventional domestic hot water heater 12. Conventional gas operated domestic hot water heaters include a gas valve 14 and a thermocouple control 15 which includes a thermocouple 16 in contact with the pilot flame of the gas burner. The thermocouple functions to generate a small electrical current which in turn energizes a solenoid valve holding it open so long as the pilot flame is burning, but closing the valve when the pilot flame is extinguished for any reason. The automatic cut-off device of this invention is intended to de-energize the thermocouple circuit when the water temperature within tank 12 reaches a temperature of approximately 208° F. or a higher temperature.

The automatic cut-off device 10 comprises a base member 17 on which may be mounted a cylindrical casing 18 and a cover 19. The base 17, casing 18 and cover 19 may be bolted together by a plurality of bolts such for example as 20. Cover 19 may be provided with a central aperture for receiving a switch member 21 having mounted thereon in substantially tangential relation thereto a wiper spring contact 22, which is adapted to normally rest in open position with respect to the bolt 23. For imparting a rotational movement to switch member 21 there is provided a spring 25 fixed at one end thereof to a flange 26 integrally formed with the switch 21, and at the other end thereof being hooked around the bolt 23 by means of the hook portion 27. Thus, referring to Fig. 3, the switch actuating member 21 may be rotated in a counter-clockwise direction putting tension on the spring 25 whereby the spring tends to rotate member 21 in counterclockwise direction to move contact blade 22 into pressure and wiping contact with bolt 23. This pressure and wiping contact is an essential feature of this invention because of the fact that the extremely weak currents generated by the thermocouple are insufficient to overcome the contact resistance between bolt 23 and wiper 22 unless there is a wiping action which removes the outer oxide coating which may form on the bolt or on the wiper arm, thereby to provide a low resistance contact.

In order to provide a temperature control of the switch actuating member 21, a tubular member 29 may be mounted in base 17 and provided with a tapered collar 30 fixed thereto, the upper and lower edges of which are tapered as indicated in Fig. 2. Cooperating with this collar 30 is a nut 32 having external threads for threadedly engaging a pipe 11 or a fitting which may be mounted directly in the shell of the tank 12. The nut 32 may be threaded into pipe 11 of tank 12, and a locknut 33 threaded into the top portion of the nut 32 may be tightened with respect to nut 32 and collar 30, whereby the two nuts forcibly engage the tapered surfaces of collar 30 and provide a seal for preventing leakage of water. Nut 32 is provided with a tube engaging portion 34 of restricted area, thereby to limit transfer of heat from tube 29 to the shell of tank 12.

Within the switch actuating member 21 and the tube 29 there is provided a stem 35 which mechanically connects switch actuating member 21 and the tube 29 through a mass of fusible metal 36, whereby at normal temperatures stem 35 is locked to the tube 29 and can not move with respect thereto. Fusible metal 36 preferably should be compounded to have a melting temperature of approximately 206° F., whereby a water temperature of 208° F. will cause the metal 36 to melt. The melting temperature may be selected within the range of 190° F. to 220° F. as desired. The lower end of tube 29 is preferably of square cross section while the lower end of stem 35 is formed into a flat blade 37 which extends almost the full width of the square end section of tube 29. The purpose of this structure is to insure that when the fusible metal melts, and the stem 35 rotates, there will be a mixing action of the fusible metal which prevents deterioration thereof or separation of its component metals. Thus even though the fusible metal 36 is melted a great number of times, it will maintain its original characteristics and always melt at the desired predetermined temperature. This square cross sectional structure of tube 29 also serves to insure that stem 35 will not be released until a major proportion of the fusible metal has melted. If tube 29 were of circular cross section, the fusible metal could melt adjacent to the inner surface of the tube 29 and release stem 35 before the water actually reached the critical temperature, thereby causing premature operation of the automatic cutoff device.

For locking the switch actuating member 21 with respect to the stem 35, there is provided a set screw 38 threaded into member 21 and movable into engagement with the upper end of stem 35. Thus, the actuating member 21 may be rotated by set screw 38 in a clockwise direction to wind the spring 25 so that when screw 38 is screwed into engagement with stem 35, the actuating member 21 will be locked in a cocked position. When the temperature of the water in tank 12 reaches approximately 208°, the fusible metal 36 will have melted entirely, thereby releasing member 21 and permitting the spring 25 to rotate this member to wipe contact 22 over the threaded surface of bolt 23.

The automatic cut-off switch 19 is connected electrically to a conductor 40 which extends between the thermocouple control device 15 and the solenoid of the control valve. This connection is effected by means of a terminal 41 mounted between the head of bolt 23 and an insulator 42. In actual practice the conductor 40 may be broken and the two ends provided with terminals 43 and 44 provided for attachment to terminal 41 by means of a bolt 45. A second insulator 46 may be provided at the other end of bolt 23 whereby it is electrically insulated from the remainder of the automatic cut-off switch. Since the switch structure is in electrical contact with the tank 12 and the water contained therein, closure of contact 22 with bolt 23 connects ground to conductor 40, thereby grounding the output current of the thermocouple device. This emphasizes the importance of the wiping contact between blade 22 and bolt 23. Thermocouple current itself is very weak, and the electrical path from conductor 40 to ground has a very low electrical resistance whether the path to ground is through the solenoid or through the structure of the cut-off switch. Therefore, it is essential to have the wiping contact which provides such a low resistance contact that the thermocouple current will be shunted to ground through tank 12 instead of through the solenoid winding.

In operation solenoid 15 is energized by the thermocouple in contact with the pilot flame to hold the gas valve 14 in open position whereby gas may flow to the burner. If for some reason or other the water in tank 12 is heated to a temperature exceeding 208° F., for example, the fusible metal 36 will melt releasing the stem 35 with respect to the tube 29, thereby permitting spring 25 to rotate switch member 21 wiping contact 22 over the threaded surface of bolt 23. Because of this wiping action a low resistance contact is established between bolt 23 and wiper 22 creating an electrical ground on conductor 40. Thus any current being generated by the thermocouple flows to ground through the structure of the switch including tube 29 and the water within tank 12. This de-energizes solenoid 15 closing the gas valve controlled thereby and cutting off the supply of gas to the burner, thereby to prevent excessive heating of the water within the tank 12.

From the foregoing description it will be apparent that this invention provides apparatus for automatically cutting off the heating element of a domestic hot water heater, which apparatus is repeatedly resettable. Furthermore, repeated operation of the apparatus will occur at a uniform predetermined temperature due to the fact that there is provided a mixing action of fusible metal 36. There is also provided structure of such a nature that a low resistance contact is established in the electrical circuit for grounding it. It follows that the apparatus provided by this invention is a positively operating safety control for automatic domestic hot water heaters.

The invention claimed is:

1. A temperature responsive switch adapted to be mounted on a hot water supply tank comprising a casing, a square ended tubular extension on said casing adapted to extend into said tank, a switch mounted in said casing and comprising a stem disposed within said extension and projecting into said casing, a paddle member on said stem disposed within the square end of said extension, a block of fusible metal fixing said paddle with respect to said extension for releasing said stem at a predetermined maximum water temperature, a switch actuating member freely mounted on the other end of said stem within said casing, a resilient wiper contact on said actuating member, coil spring means anchored to said actuating member and to said casing, a set screw threaded in said actuating member for rotating it on said stem against the tension of said spring and locking said actuating member to said stem in cocked position, and a threaded contact bolt disposed in the path of said wiper whereby sliding contact is made with said bolt when said fusible metal melts.

2. A temperature responsive switch adapted to be mounted on a hot water supply tank comprising a casing, a square ended tubular extension on said casing adapted to extend into said tank, and a switch mounted in said casing and comprising a stem disposed within said extension and projecting into said casing, a paddle member on said stem disposed within the square end of said extension, and a block of fusible metal fixing said paddle with respect to said extension for releasing said stem at a predetermined maximum water temperature.

3. A temperature responsive control device adapted to be mounted on a hot water supply tank comprising a square ended casing adapted to extend into said tank and comprising a stem disposed within said casing, a paddle member on said stem disposed within the square end of said casing, and a block of fusible metal fixing said paddle with respect to said casing for releasing said stem at a predetermined maximum water temperature.

References Cited in the file of this patent

UNITED STATES PATENTS

| 1,551,314 | Krantz | Aug. 25, 1925 |
| 2,136,698 | Leland | Nov. 15, 1938 |
| 2,150,858 | Eggleston | Mar. 14, 1939 |
| 2,307,356 | Birk | Jan. 5, 1943 |
| 2,362,398 | Pittman | Nov. 7, 1944 |
| 2,383,676 | Paille | Aug. 28, 1945 |
| 2,385,530 | Paille | Sept. 25, 1945 |
| 2,422,842 | Molyneus | June 24, 1947 |
| 2,490,020 | Engler | Dec. 6, 1949 |

FOREIGN PATENTS

| 680,611 | Germany | Sept. 2, 1939 |